United States Patent [19]

Ogawa et al.

[11] Patent Number: 4,522,668
[45] Date of Patent: Jun. 11, 1985

[54] METHOD OF PRODUCING CERAMIC FILTER

[75] Inventors: Yutaka Ogawa, Nagoya; Tsunezo Takeuchi, Chita; Masashi Otaka, Mie, all of Japan

[73] Assignee: NGK Insulators, Ltd., Japan

[21] Appl. No.: 487,266

[22] Filed: Apr. 21, 1983

[30] Foreign Application Priority Data

Sep. 30, 1982 [JP] Japan .................. 57-169619

[51] Int. Cl.³ .............. C03B 29/00; C04B 33/34; C04B 37/00
[52] U.S. Cl. .................. 156/89; 156/252; 156/253; 156/510; 156/513
[58] Field of Search .............. 156/89, 253, 252, 510, 156/513, 514

[56] References Cited

U.S. PATENT DOCUMENTS

| | | | |
|---|---|---|---|
| 2,545,243 | 3/1951 | Rumsey | 156/253 |
| 4,293,357 | 10/1981 | Higuchi et al. | 156/89 |
| 4,326,909 | 4/1982 | Slavik | 156/253 |

Primary Examiner—Willard E. Hoag
Assistant Examiner—Timothy W. Heitbrink
Attorney, Agent, or Firm—Parkhurst & Oliff

[57] ABSTRACT

The disclosed method and device use a gear rotatably carried by a holder and a movable support board supporting a film-attached ceramic honeycomb body, the gear having pointed teeth disposed at a suitable pitch, and as being thrusted into the body through the film attached to the body the gear is allowed to sway, so that the film is perforated at positions corresponding to selected open ends of throughholes of the body while allowing the gear to sway, so that the throughholes are selectively plugged by pressing sealant therein through the perforated film and the body is rendered into a ceramic honeycomb filter with filtering passages formed of partitions of the thus plugged throughholes.

21 Claims, 10 Drawing Figures

METHOD OF PRODUCING CERAMIC FILTER

BACKGROUND OF THE INVENTION

1. Field of the Invention

This invention relates to a method of producing a ceramic honeycomb filter and a film perforating device therefor. More particularly, the invention relates to a method of producing a ceramic honeycomb filter by using a film applied to one or both end surfaces of a ceramic honeycomb body for selectively sealing open ends of throughholes thereof, and also relates to a film perforating device for selectively boring holes on the above-mentioned film at positions corresponding to selected open ends of the throughholes to be sealed.

2. Description of the Prior Art

To purify exhaust gas from an internal combustion engine, a ceramic honeycomb filter has been used, and the said filter comprises a ceramic honeycomb body made of porous ceramic material and having a plurality of throughholes extending therethrough. Some of the throughholes in such ceramic honeycomb body of the filter are sealed by suitable sealant at one side ends thereof, while the remaining throughholes thereof are sealed by suitable sealant at the opposite ends thereof, so that the partition walls between the adjacent throughholes act as filtering layers.

For the production of such ceramic honeycomb fitler, a method has been proposed by U.S. Pat. No. 4,293,357, which comprises steps of attaching a film onto that open end surface of an extruded ceramic honeycomb body which is to be selectively sealed, perforating holes on the film at positions corresponding to desired end openings of throughholes of the honeycomb body, filling a sealant into the honeycomb body through the thus perforated holes of the film, and firing the honeycomb body at 800°–1,400° C. so as to burn away the film while sintering the sealant for sealing the desired open ends of the selected throughholes of the ceramic honeycomb body.

However, the proposed method has a shortcoming in that each of the throughholes of the extruded ceramic honeycomb body has strain or deformation caused during the extrusion or caused by firing shrinkage, and such a strain makes it very difficult to properly perforate the film at the open end of the ceramic honeycomb body at a high efficiency. In fact, there is no film perforating device available for efficiently perforating the above-mentioned film in producing the ceramic honeycomb filter.

SUMMARY OF THE INVENTION

Therefore, an object of the present invention is to obviate the above-mentioned shortcoming of the prior art by providing an improved method of producing a ceramic honeycomb filter and an improved perforating device therefor.

Another object of the invention is to provide a method and a device for efficiently perforating properly-disposed holes on a film attached to an open end of a ceramic honeycomb body having a plurality of throughholes extending therethrough, which throughholes are strained and distributed at an uneven pitch.

In the method of producing a ceramic honeycomb filter according to the present invention, a film is attached to each of those open end surfaces of a ceramic honeycomb body which are to be selectively sealed, and the ceramic honeycomb body is placed on a support board while disposing said film attached to said body immediately below a gear rotatably carried by a holder. The ceramic honeycomb body has a plurality of throughholes extending therethrough at a certain pitch. The gear has pointed teeth formed at positions selected from tooth positions defined on root cylinder of the gear at a tooth root pitch smaller than said pitch of the throughholes. The pointed teeth have such a tooth depth that adjacent teeth can simultaneously thrust into adjacent ones of the throughholes and the tips of the pointed teeth can roll along a locus passing the inside of the throughholes. A suitable actuating means, such as a moving table carrying the support board, actuates relative movement between the holder and the support board. At the same time, the gear is swayed in response to rotation of the gear so as to make up for the difference between the tooth root pitch of the gear and the throughholes pitch of the ceramic honeycomb body, so as to perforate the film at positions corresponding to desired open ends of the ceramic honeycomb body throughholes to be sealed. Then, a suitable sealant is pressed into said ceramic honeycomb body through the thus perforated holes of the film. Whereby, the ceramic honeycomb body is rendered into a ceramic honeycomb filter having the throughholes thereof selectively sealed at the desired open ends thereof.

An embodiment of the film perforating device according to the present invention uses a gear rotatably held by a holder, which gear has pointed teeth formed at positions selected from tooth positions defined on root cylinder of the gear at a tooth root pitch smaller than the above-mentioned pitch of the throughholes of the ceramic honeycomb body. A support board is disposed below the holder of the gear with a sufficient space therefrom for supporting a film-attached ceramic honeycomb body thereon while placing a film of said body immediately below the gear. The pointed teeth of the gear have such a tooth depth that adjacent pointed teeth can simultaneously thrust into adjacent ones of said throughholes and the tips of the pointed teeth can roll along a locus passing the inside of the throughholes. An actuating means is operatively related to the holder and the support board so as to actuate relative movement between the holder and the support board. On the other hand, a swaying means is coupled to the holder of the gear, so that the gear is swayed in response to rotation of the gear so as to make up for the difference between the tooth root pitch of the gear and the throughholes pitch of the ceramic honeycomb body. Whereby, upon actuation of the actuating means, the film which is attached to the ceramic honeycomb body on the support board is perforated at positions corresponding to desired open ends of the ceramic honeycomb body throughholes to be sealed.

BRIEF DESCRIPTION OF THE DRAWINGS

For a better understanding of the invention, reference is made to the accompanying drawings, in which.

Figure 1:
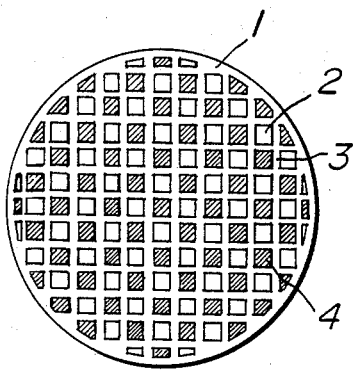
FIG. 1 is an end view of an example of the ceramic honeycomb filter produced by using the film perforating device of the invention.
Figure 2:
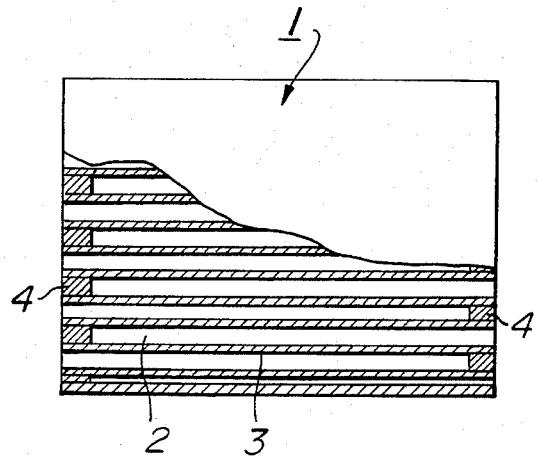
FIG. 2 is a partially cutaway side view of the ceramic honeycomb filter of FIG. 1.

Throughout different views of the drawing, 1 is a ceramic honeycomb filter, 2 is a throughhole, 3 is a partition, 4 and 4' are sealants, 5 is a gear, 6 is a tooth, 7 is a central hole of the gear, 8 is a tooth root, 9 is a tooth tip, 10 is a shaft, 11 is a holder, 12 and 12' are resilient support members, 13 is a stay member, 14 is a support board, 15 is a guide plate, 16 is a moving table, 17 is a base member, 18 is a ceramic honeycomb body, and 19 is an arm.

DESCRIPTION OF THE PREFERRED EMBODIMENTS

Referring to FIG. 1, a ceramic honeycomb filter 1 is produced by using a ceramic honeycomb body formed of porous ceramic material and having a plurality of throughholes 2 defined by thin porous partitions 3, and some of the throughholes 2 are plugged at one side open ends thereof with sealant 4 while the remainder of the throughholes 2 are plugged at the opposite open ends thereof with sealant 4', so as to provide filtering layers formed of the porous partitions 3.

Figure 3:
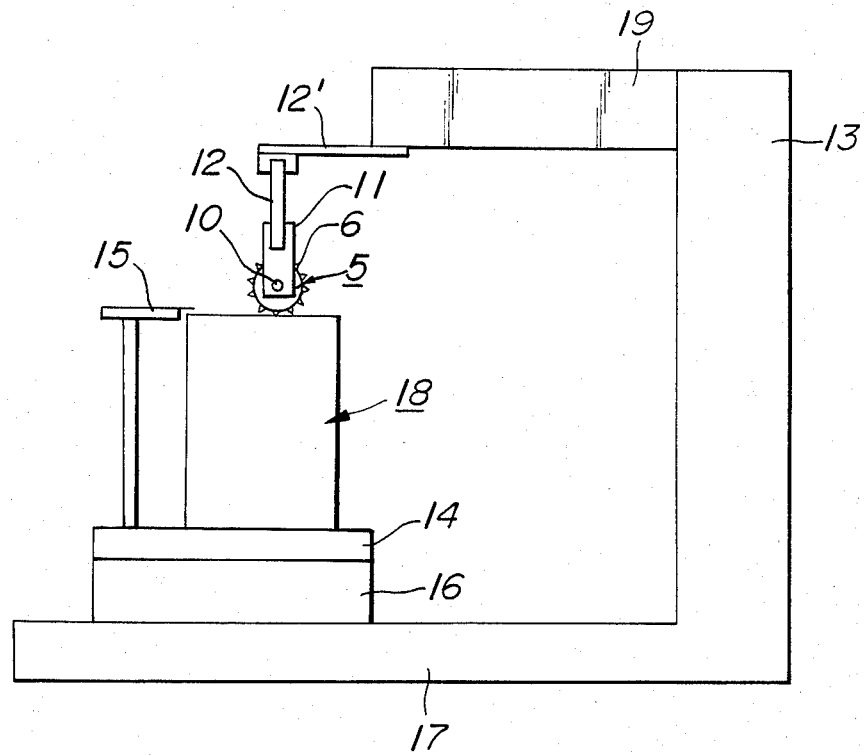
FIG. 3 is a schematic side view of an embodiment of the film perforating device according to the present invention.
Figure 5:
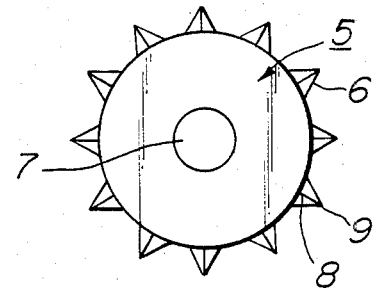
FIG. 5 is a side view of an example of the gear to be used in the method and film perforating device of the present invention.
Figure 6:
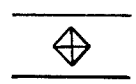
FIG. 6 is a partial side view of the example of FIG. 5, as seen from the direction of the arrow therein.
Figure 9:
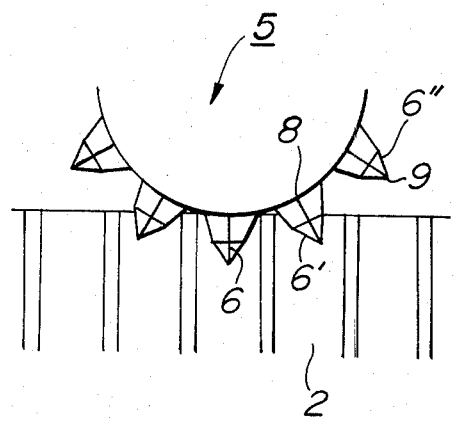
FIG. 9 and FIG. 10 are explanatory diagrams of the meshing between the teeth of the gear with throughholes of a ceramic honeycomb body.
Figure 10:
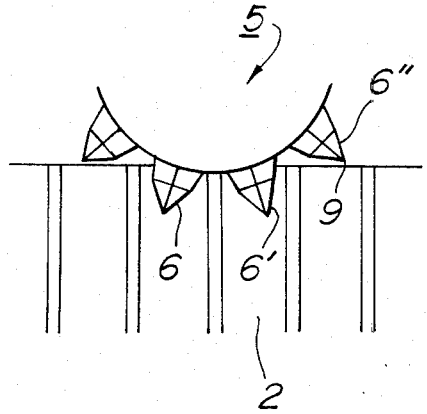

In an embodiment of the film perforating device of the invention illustrated in FIG. 3, a gear 5 has a number of teeth 6 extending from a root cylinder of the gear 5 at a tooth root pitch which is smaller than the pitch of throughholes 2 in the ceramic honeycomb body 18 to be processed. Referring to FIG. 5 and FIG. 6, each tooth 6 has a tooth root 8 and a tooth tip 9, and tooth depth of the tooth 6 is given by the distance between the tooth root 8 and the tooth tip 9. According to the present invention, the tooth root pitch and the tooth depth of the teeth 6 of the gear 5 are selected in such a manner that, when the gear 5 rolls on an end surface of a ceramic honeycomb body 18, a plurality of teeth 6 can simultaneously mesh a plurality of ceramic honeycomb body throughholes 2, as shown in FIG. 9 and FIG. 10. Whereby, smooth rolling of the gear 5 on the end surface of the ceramic honeycomb body 18 is ensured, even if the end openings of the ceramic honeycomb body throughholes 2 are strained or the pitch of the throughholes 2 of the ceramic honeycomb body 18 is uneven.

Besides, the tooth depth of the teeth 6 must be large enough for allowing the tooth tips 9 can roll along a locus which passes the inside of the throughholes 2 of the ceramic honeycomb body 18.

Figure 7:
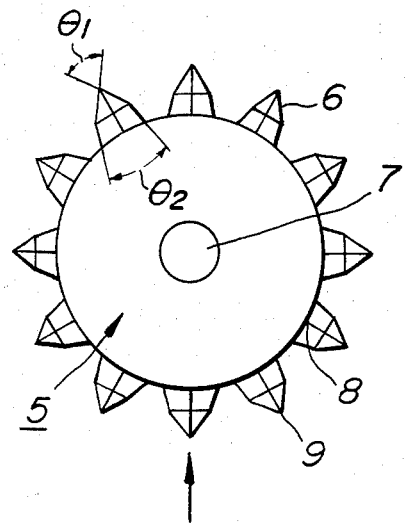
FIG. 7 is a view similar to FIG. 5, showing another example of the gear to be used in the invention.
Figure 8:
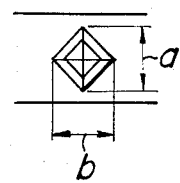
FIG. 8 is a partial side view of the example of FIG. 7, as seen from the direction of the arrow therein.

As to the shape of the tooth 6, two-staged pyramid may be used as shown in FIG. 7 and FIG. 8. For instance, a tip side quadrangular pyramid is mounted on the top of a root side truncated quadrangular pyramid, and the bottom plane of the truncated quadrangular pyramid has a diagonal b disposed in the rolling direction of the gear 5, which diagonal b is shorter than another diagonal a of the bottom plane. The tip side pyramid has a vertical angle $\theta_1$ which is larger than the vertical angle $\theta_2$ of the root side truncated quadrangular pyramid.

Although the two-staged quadrangular pyramid shape of the teeth 6 shown in FIG. 7 and FIG. 8 is suitable for perforating holes which are small as compared with the end openings of the ceramic honeycomb body throughholes 2, it is also possible to use conical teeth 6 or teeth 6 of triangular or hexagonal pyramid shape, depending on the shape of the throughholes to be perforated.

It should be noted here that the gear 5 of FIG. 5 or FIG. 7 has the teeth 6 arranged in a manner suitable for perforating the film for all the holes of the linearly aligned adjacent throughholes 2 of the ceramic honeycomb body 18. If it is desired to perforate the film for every other throughholes 2 of the ceramic honeycomb body 18, the number of the teeth 6 on the gear 5 may be reduced, for instance, by removing every other teeth 6 from the gear 5 of FIG. 7. More particularly, the positions of teeth 6 of the gear 5 must be determined by selecting a tooth root pitch which is smaller than the pitch of the throughholes 2 in the ceramic honeycomb body 18, and some of the teeth positions thus determined may be left vacant, depending on the desired distribution pattern of the holes to be bored.

Preferably, a gap of 0.05–0.50 mm is provided between the shaft 10 and the central hole 7 of the gear 5. The reason for providing such gap is in that the gap provides for smooth rotation of the gear 5 both when the ceramic honeycomb body throughholes 2 are strained and when the gear 5 is heated as will be described hereinafter.

Although only one gear 5 is shown in the embodiment of FIG. 3, a number of similar gears 5 can be used in parallel depending on the number of the throughholes 2 of the ceramic honeycomb body 18 to be sealed and the desired pattern of holes to be bored through the film attached to the ceramic honeycomb body 18.

Figure 4:
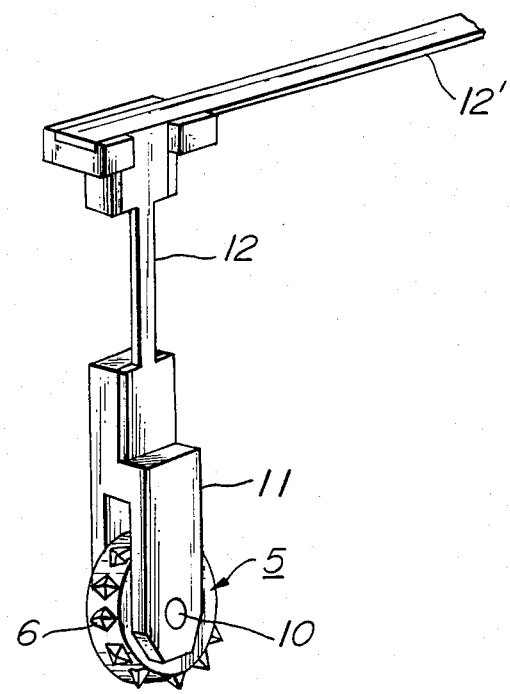
FIG. 4 is a schematic perspective view of the manner in which a gear to be used in the present invention is carried by a holder connected to resilient support members.

Referring to FIG. 4, the gear 5 is rotatably mounted on a shaft 10 which is carried by a holder 11. The top end of the holder 11 is connected to one end of a resilient support member 12 extending vertically or in the normal direction to the rolling direction of the gear 5 at that point of the rolling locus of the tooth tip 9 which thrusts more into the ceramic honeycomb body 18 than any other points thereof. The opposite end of the resilient support member 12 is connected to another resilient support member 12' which is secured to a fixed arm 19 and extends horizontally therefrom or at right angles to the first resilient support member 12, so as to support the gear 5 at a desired position, as shown in FIG. 3.

Due to the resiliency of the support members 12 and 12', the gear 5 can follow irregularities in the shape of the ceramic honeycomb body throughholes 2 caused by strains or deformation thereof and uneven pitches thereof, so that the teeth 6 of the gear 5 are guided into the throughholes 2 without failure.

Preferably, the gear 5 is heated to 200°–400° C., depending on the material of the film to be bored, which is attached to the end surface of the ceramic honeycomb body 18. To effect such heating of the gear 5, suitable heating means such as a burner or electrodes of an induction heater may be provided in the proximity of the gear 5. A part of the film perforated by the heated gear 5 is forcedly pushed into along the partition wall of throughholes of the honeycomb body, whereby a perforated bore shape having a size suitable for filling the sealant is formed.

In a preferred embodiment as shown in FIG. 3, a guide plate 15 is disposed near the peripheral edge of the open end of the ceramic honeycomb body 18, where the film to be perforated is attached. Thereby, the gear 5 is guided to the proper perforating position.

The ceramic honeycomb body 18 is placed on a support board 14, and the support board 14 is carried by a moving table 16 which is disposed on a base member 17 of the film perforating device. A stay member 13 rigidly connects the arm 19 to the base member 17 with such a spacing therebetween that, when the ceramic honeycomb body 18 is mounted on the film perforating device in the above-mentioned manner, the gear 5 is ready for rolling on the film attached to the top end or the desired open end of the ceramic honeycomb body 18 in response to the movement of the moving table 16.

Instead of using the moving table 16, the ceramic honeycomb body 18 may be held stationary and the gear 5 may be moved along the surface of the film attached to the top end of the ceramic honeycomb body 18 by making the arm 19 movable relative to the stay member 13 extending upright from the base member 17.

An example of the method of the invention will be described now in detail by referring to FIG. 9 and FIG. 10. Preferably, the gear 5 is guided to the position of the desired throughholes 2 of the ceramic honeycomb body 18 by the guide plate 15. When the gear 5 is rotated in response to the movement of the moving table 16 of FIG. 3, any deviation of the center line of the tooth 6 of the gear 5 from the center line of the corresponding throughhole 2 of the ceramic honeycomb body 18 is automatically corrected by swaying movement of the gear 5, which swaying movement compensates for the difference between the tooth root pitch of the gear 5 and the throughhole pitch of the ceramic honeycomb body 18. The present invention has succeeded in achieving the above-mentioned swaying movement by combined effects of the following factors; namely, that the tooth root pitch of the gear 5 is smaller than the throughhole pitch of the ceramic honeycomb body 18, that a number of teeth 6, e.g., two to three teeth 6, of the gear 5 can simultaneously mesh the throughholes 2, that the tooth depth of the gear 5 is large enough for causing the teeth 6 to roll along a locus passing through the inside of the throughholes 2, and that the support members 12 and 12' are resilient. As a result of the abovementioned automatic correction, fine adjustment of the position of the specific tooth 6 relative to the corresponding ceramic honeycomb body throughholes 2 is effected, so that the succeeding teeth 6' and 6" can thrust into the succeeding throughholes 2 without failure. Whereby, smooth rotation of the gear 5 is ensured.

Consequently, the film perforating device of the invention can deal with any strains or deformations of the end openings of the ceramic honeycomb body and any unevenness or dispersion of the throughhole pitch thereof.

As described in the foregoing, with the method and the film perforating device according to the present invention, a ceramic honeycomb body and the like article having strain or deformation can be efficiently perforated, so that a ceramic honeycomb filter or a like plugged ceramic honeycomb body can be produced easily and efficiently on a mass-production basis. Thus, the invention contributes greatly to the industry.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A method of producing a ceramic honeycomb filter, comprising the steps of:
    attaching a film to at least one open end surface of a ceramic honeycomb body which is to be selectively sealed, said ceramic honeycomb body having throughholes extending therethrough in a longitudinal and lateral direction at a certain
    placing said ceramic honeycomb body on a support board to position said film immediately below a heated gear rotatably mounted on a resilient holding means, wherein said heated gear has heated pointed teeth attached thereto, said heated teeth being positioned complementary with tooth positions defined on a root cylinder of the heated gear at a tooth root pitch which is less than said pitch of the throughholes, said heated pointed teeth having such a tooth depth that adjacent heated teeth can simultaneously thrust into adjacent throughholes or every other throughhole, while tips of said pointed teeth can roll along a locus passing inside of said throughholes;
    actuating relative movement between said holder and said support board;
    swaying the heated gear in response to rotation of the heated gear so as to make up for a difference between the tooth root pitch of the gear and the throughhole pitch of the ceramic honeycomb body, for perforating said film at positions corresponding to desired open ends of the ceramic honeycomb body throughholes to be sealed; and
    pressing a sealant into said ceramic honeycomb body through the thus perforated holes of the film, whereby the ceramic honeycomb body becomes a ceramic honeycomb filter having the throughholes thereof selectively sealed at the desired open ends thereof, to provide a checkered flag pattern.

2. The method of claim 1, wherein said swaying of the heated gear is effected by providing a gap between a central hole of said heated gear and a shaft extending through said central hole, said shaft being connected to said holding means.

3. The method of claim 1, wherein said swaying of the heated gear is effected by supporting said heated gear by a resilient support means.

4. The method of claim 3, wherein said resilient support means has a first resilient support member and a second resilient support member, said first resilient support member being connected to said holder so as to extend in a normal direction to a rolling direction of the heated gear at the heated gear tooth rolling locus of the heated gear which thrusts more into said ceramic honeycomb body than any other points of the locus, said second resilient support member being connected to said first resilient support member so as to extend at right angles thereto.

5. The method of claim 1, wherein each of said heated teeth of the heated gear has a shape of two-staged pyramid, formed of a tip side pyramid mounted on a top surface of a root side truncated pyramid, a bottom surface of said root side truncated pyramid having a first diagonal disposed in alignment with the rolling direction of the heated gear and another diagonal longer than said first diagonal aligned with said rolling direction, said tip side pyramid having a vertical angle which is larger than that of said root side truncated pyramid.

6. The method of claim 3, wherein each of said heated teeth of the heated gear has a shape of a two-staged pyramid, formed of a tip side pyramid mounted on a top surface of a root side truncated pyramid, a bottom surface of said root side pyramid having a diagonal disposed in alignment with the rolling direction of the heated gear and another diagonal longer than said diagonal aligned with said rolling direction, said tip side pyramid having a vertical angle which is greater than that of said root side truncated pyramid.

7. The method of claim 4, wherein each of said teeth of the heated gear has a shape of two-staged pyramid, formed of a tip side pyramid mounted on a top surface of a root side truncated pyramid, a bottom surface of said root side pyramid having a first diagonal disposed in alignment with the rolling direction of the heated gear and another diagonal longer than said first diagonal aligned with said rolling direction, said tip side pyramid having a vertical angle which is greater than that of said root side truncated pyramid.

8. The method of claim 1, wherein the relative movement between the heated gear and the ceramic honeycomb body is guided by disposing a guide plate adjacent to an outer periphery of that end surface of the ceramic honeycomb body which is immediately below the heated gear.

9. The method of claim 3, wherein the relative movement between the heated gear and the ceramic honeycomb body is guided by disposing a guide plate adjacent to an outer periphery of that end surface of the ceramic honeycomb body which is immediately below the heated gear.

10. The method of claim 4, wherein the relative movement between the heated gear and the ceramic honeycomb body is guided by disposing a guide plate adjacent an outer periphery of that end surface of the ceramic honeycomb body which is immediately below the heated gear.

11. The method of claim 5, wherein the relative movement between the heated gear and the ceramic honeycomb body is guided by disposing a guide plate adjacent to an outer periphery of that end surface of the ceramic honeycomb body which is immediately below the heated gear.

12. The method of claim 1, wherein the film is attached to two end surfaces of the ceramic honeycomb body and a first end surface is perforated and sealed by plugging a sealant in a checkered flag pattern and a second end surface is perforated and sealed by plugging a sealant in a checkered flag pattern.

13. A method of producing a ceramic honeycomb filter, comprising the steps of:
attaching a film to at least one open end surface of a ceramic honeycomb body which is to be selectively sealed, said ceramic honeycomb body having throughholes extending therethrough in a longitudinal and lateral direction at a certain pitch;
placing said ceramic honeycomb body on a support board to position said film immediately below a heated gear rotatably mounted on a holding means, wherein said heated gear has heated pointed teeth attached thereto, wherein said heated teeth being positioned complementary with tooth positions defined on a root cylinder of the heated gear at a tooth root pitch which is less than said pitch of the throughholes, said heated pointed teeth having such a tooth depth that adjacent heated teeth can simultaneously thrust into adjacent throughholes or every other throughhole, while tips of said pointed teeth can roll along a locus passing inside of said throughholes;
actuating relative movement between said holder and said support board;
swaying the heated gear in response to rotation of the heated gear so as to make up for a difference between the tooth root pitch of the gear and the throughhole pitch of the ceramic honeycomb body, for perforating said film at positions corresponding to desired open ends of the ceramic honeycomb body throughholes to be sealed, wherein said swaying is effected by providing a gap between a central hole of the heated gear and a shaft which is connected to said holding means and by supporting said heated gear by a resilient supporting means; and
pressing a sealant into said ceramic honeycomb body through the thus perforated holes of the film, whereby the ceramic honeycomb body becomes a ceramic honeycomb filter having the throughholes thereof selectively sealed at the desired open ends thereof, to provide a checkered flag pattern.

14. The method of claim 13, wherein said resilient support means has a first resilient support member and a second resilient support member, said first resilient support member being connected to said holder so as to extend in a normal direction to a rolling direction of the heated gear at the heated gear tooth rooling locus of the heated gear which thrusts more into said ceramic honeycomb body than any other points of the locus, said second resilient support member being connected to said first resilient support member so as to extend at right angles thereto.

15. The method of claim 13, wherein each of said heated teeth of the heated gear has a shape of two-staged pyramid, formed of a tip side pyramid mounted on a top surface of a root side truncated pyramid, a bottom surface of said root side truncated pyramid having a first diagonal disposed in alignment with the rolling direction of the heated gear and another diagonal longer than said first diagonal aligned with said rolling direction, said tip side pyramid having a vertical angle which is larger than that of said root side truncated pyramid.

16. The method of claim 14, wherein each of said heated teeth of the heated gear has a shape of a two-staged pyramid, formed of a tip side pyramid mounted on a top surface of a root side truncated pyramid, a bottom surface of said root side pyramid having a first diagonal disposed in alignment with the rolling direction of the gear and another diagonal longer than said first diagonal aligned with said rolling direction, said tip side pyramid having a vertical angle which is greater than that of said root side truncated pyramid.

17. The method of claim 15, wherein each of said teeth of the heated gear has a shape of two-staged pyramid, formed of a tip side pyramid mounted on a top surface of a root side truncated pyramid, a bottom surface of said root side pyramid having a first diagonal disposed in alignment with the rolling direction of the heated gear and another diagonal longer than said first diagonal aligned with said rolling direction, said tip side pyramid having a vertical angle which is greater than that of said root side truncated pyramid.

18. The method of claim 13, wherein the relative movement between the heated gear and the ceramic honeycomb body is guided by disposing a guide plate adjacent to an outer periphery of that end surface of the ceramic honeycomb body which is immediately below the heated gear.

19. The method of claim 13, wherein the relative movement between the heated gear and the ceramic honeycomb body is guided by disposing a guide plate adjacent to an outer periphery of that end surface of the ceramic honeycomb body which is immediately below the heated gear.

20. The method of claim 14, wherein the relative movement between the heated gear and the ceramic honeycomb body is guided by disposing a guide plate adjacent an outer periphery of that end surface of the ceramic honeycomb body which is immediately below the heated gear.

21. The method of claim 15, wherein the relative movement between the heated gear and the ceramic honeycomb body is guided by disposing a guide plate adjacent to an outer periphery of that end surface of the ceramic honeycomb body which is immediately below the heated gear.

* * * * *